United States Patent
Lee

(10) Patent No.: US 11,861,934 B2
(45) Date of Patent: Jan. 2, 2024

(54) DRIVING METHOD OF DISPLAY DEVICE

(71) Applicant: Samsung Display Co., Ltd., Yongin-Si (KR)

(72) Inventor: Soongyu Lee, Seoul (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 17/967,712

(22) Filed: Oct. 17, 2022

(65) Prior Publication Data

US 2023/0260319 A1 Aug. 17, 2023

(30) Foreign Application Priority Data

Feb. 15, 2022 (KR) .......................... 10-2022-0019611

(51) Int. Cl.
```
G06K 9/00       (2022.01)
G06V 40/12      (2022.01)
G06F 3/041      (2006.01)
G06V 10/10      (2022.01)
G06V 40/13      (2022.01)
G09G 3/3241     (2016.01)
```

(52) U.S. Cl.
CPC ...... *G06V 40/1365* (2022.01); *G06F 3/04166* (2019.05); *G06V 10/17* (2022.01); *G06V 40/1318* (2022.01); *G09G 3/3241* (2013.01); *G09G 2310/08* (2013.01); *G09G 2354/00* (2013.01)

(58) Field of Classification Search
CPC ............... G06V 40/1365; G06V 10/17; G06V 40/1318; G06F 3/04166; G06F 3/041; G09G 3/3241; G09G 2310/08; G09G 2354/00
See application file for complete search history.

(56) References Cited

U.S. PATENT DOCUMENTS

| | | | |
|---|---|---|---|
| 10,922,516 B2 | 2/2021 | Kim et al. | |
| 11,158,258 B2 | 10/2021 | Cha et al. | |
| 2021/0191554 A1 | 6/2021 | Jun | |
| 2021/0326564 A1* | 10/2021 | Yao | ........................ G06F 3/041 |
| 2021/0398481 A1 | 12/2021 | Haas et al. | |
| 2021/0407327 A1 | 12/2021 | Li et al. | |

FOREIGN PATENT DOCUMENTS

| | | |
|---|---|---|
| KR | 10-1839337 B1 | 6/2017 |
| KR | 10-2019-0081730 A | 7/2017 |
| KR | 10-2020-0015869 A | 2/2020 |
| KR | 10-20210064483 A | 6/2021 |
| KR | 10-2021-0081907 A | 7/2021 |

* cited by examiner

*Primary Examiner* — Abdul-Samad A Adediran
(74) *Attorney, Agent, or Firm* — Innovation Counsel LLP

(57) ABSTRACT

Disclosed is a driving method of a display device which includes driving a display panel, which includes a pixel and a fingerprint sensor and displays a static image and a dynamic Image, at a first frequency, and driving the display panel at a second frequency lower than the first frequency for the purpose of sensing a finger and reading a fingerprint through the fingerprint sensor. The driving of the display panel at the second frequency includes driving the display panel at a (2-1)-th frequency when the display panel senses the fingerprint and displays the dynamic image, and driving the display panel at a (2-2)-th frequency different in value from the (2-1)-th frequency when the display panel senses the fingerprint and displays the static image.

20 Claims, 13 Drawing Sheets

DRIVING METHOD OF DISPLAY DEVICE

CROSS-REFERENCE TO RELATED APPLICATIONS

This application claims priority under 35 U.S.C. § 119 to Korean Patent Application No. 10-2022-0019611 filed on Feb. 15, 2022 in the Korean Intellectual Property Office, the disclosure of which is incorporated by reference herein in its entirety.

BACKGROUND

Embodiments of the present disclosure described herein relate to a driving method of a display device.

An electronic device that provides an image to a user, such as a smartphone, a digital camera, a notebook computer, a navigation system, or a smart television, includes a display device for displaying an image. The display device includes a display panel for generating an image, an input device such as an input sensing part, a camera, and various sensors.

The input sensing part is disposed on the display panel and senses a touch from the user. The camera photographs and stores an external image. The sensors may include a fingerprint sensor, a proximity sensor, an illumination sensor, and the like. The fingerprint sensor among the sensors senses a fingerprint on the display panel. The fingerprint sensor is implemented with a separate module and is disposed in the display device.

SUMMARY

Embodiments of the present disclosure provide a driving method of an image sensor capable of securing a driving time of a fingerprint sensor disposed in a display panel.

According to an aspect, a driving method of a display device may include driving a display panel, which includes a pixel and a fingerprint sensor and displays a static image and a dynamic Image, at a first frequency, and driving the display panel at a second frequency lower than the first frequency for the purpose of sensing a finger and reading a fingerprint of the finger through the fingerprint sensor. The driving of the display panel at the second frequency may include driving the display panel at a (2-1)-th frequency when the display panel senses the fingerprint and displays the dynamic image, and driving the display panel at a (2-2)-th frequency different in value from the (2-1)-th frequency when the display panel senses the fingerprint and displays the static image.

According to another aspect, a driving method of a display device may include driving a display panel, which includes a pixel and a fingerprint sensor and displays a static image and a dynamic Image at a first frequency, and driving the display panel at a second frequency lower than the first frequency for the purpose of sensing a fingerprint through the fingerprint sensor. The driving of the display panel at the second frequency may include driving the display panel at a (2-1)-th frequency when the display panel senses the fingerprint and displays the dynamic Image, and driving the display panel at a (2-2)-th frequency when the display panel senses the fingerprint and displays the static image. The (2-1)-th frequency and the (2-2)-th frequency may be varied to gradually decrease, and a slope associated with a variable state of the (2-1)-th frequency may be smaller than a slope associated with a variable state of the (2-2)-th frequency.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
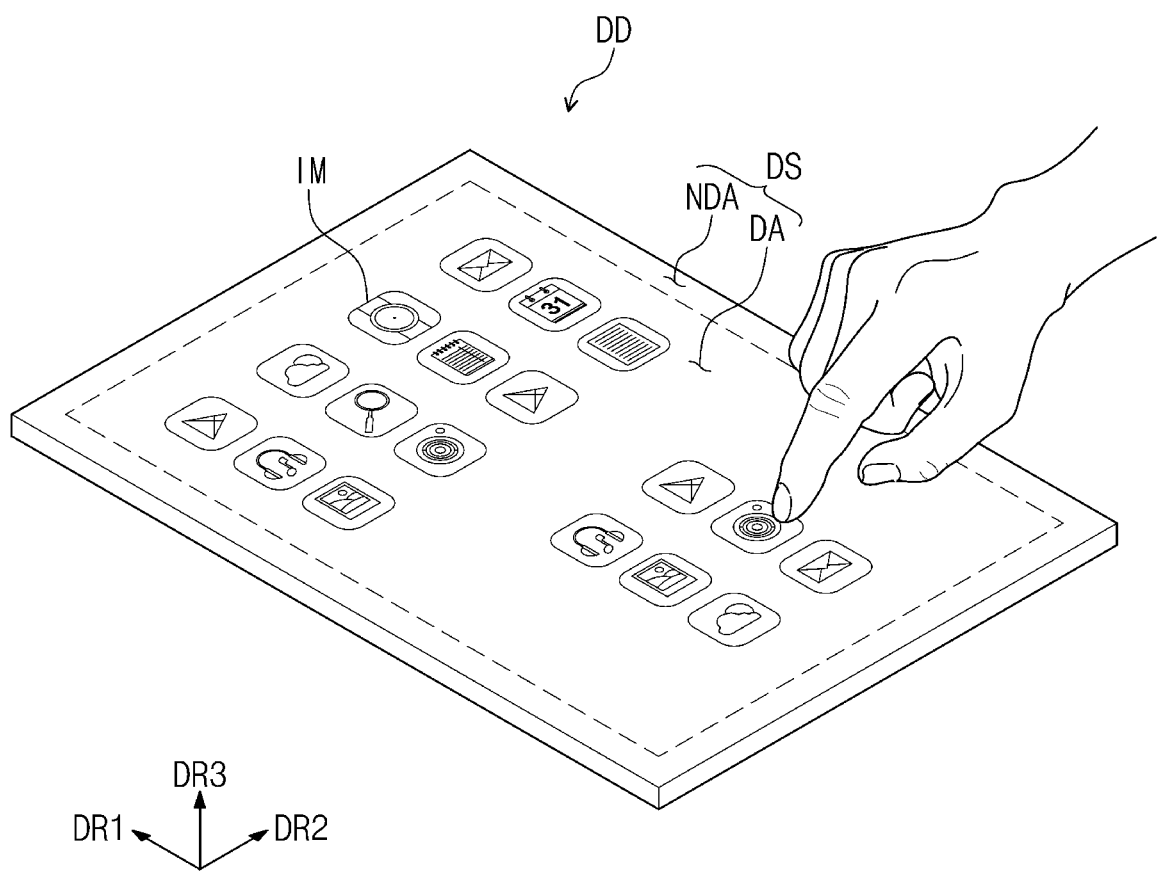
FIG. 1 is a perspective view of a display device according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. In addition, in drawings, thicknesses, proportions, and dimensions of components may be exaggerated to describe the technical features effectively.

The term "and/or" includes one or more combinations of the associated listed items.

The terms "first", "second", etc. are used to describe various components, but the components are not limited by the terms. The terms are only used to distinguish one component from another component. For example, without departing from the scope and spirit of the present disclosure, a first component may be referred to as a "second component", and similarly, the second component may be referred to as the "first component". The singular forms are intended to include the plural forms unless the context clearly indicates otherwise.

Also, the terms "under", "beneath", "on", "above", etc. are used to describe a relationship between components illustrated in a drawing. The terms are relative and are described with reference to a direction indicated in the drawing.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof. As used herein, "sensing a fingerprint" is intended to mean sensing the finger and reading the fingerprint from the finger.

Below, embodiments of the present disclosure will be described with reference to accompanying drawings.

FIG. 1 is a perspective view of a display device according to an embodiment of the present disclosure.

Referring to FIG. 1, a display device DD according to an embodiment of the present disclosure may be in the shape of a rectangle having long sides (or edges) extending in a first direction DR1 and short sides (or edges) extending in a second direction DR2 intersecting the first direction DR1. However, the present disclosure is not limited thereto. For example, the display device DD may have various shapes such as a circle or a polygon.

Hereinafter, a direction that is substantially perpendicular to a plane defined by the first direction DR1 and the second direction DR2 is defined as a third direction DR3. Also, in the specification, the expression "when viewed from above a plane" may mean "when viewed in the third direction DR3".

An upper surface of the display device DD may be defined as a display surface DS and may have a plane defined by the first direction DR1 and the second direction DR2. Images IM generated by the display device DD may be provided to a user through the display surface DS.

The display surface DS may include a display area DA and a non-display area NDA surrounding the display area DA. The display area DA may display an image, the non-display area NDA may not display an image. The non-display area NDA may surround the display area DA and may define a border of the display device DD printed in a given color.

The display device DD may be used for a large-sized electronic device such as a television, a monitor, or an outer billboard. Also, the display device DD may be used for small and medium-sized electronic devices such as a personal computer, a notebook computer, a personal digital terminal, an automotive navigation system, a game console, a smartphone, a tablet, or a camera. However, the above examples are provided only as an embodiment, and it is obvious that the display device DD may be applied to any other electronic device(s) without departing from the concept of the present disclosure.

Figure 2:
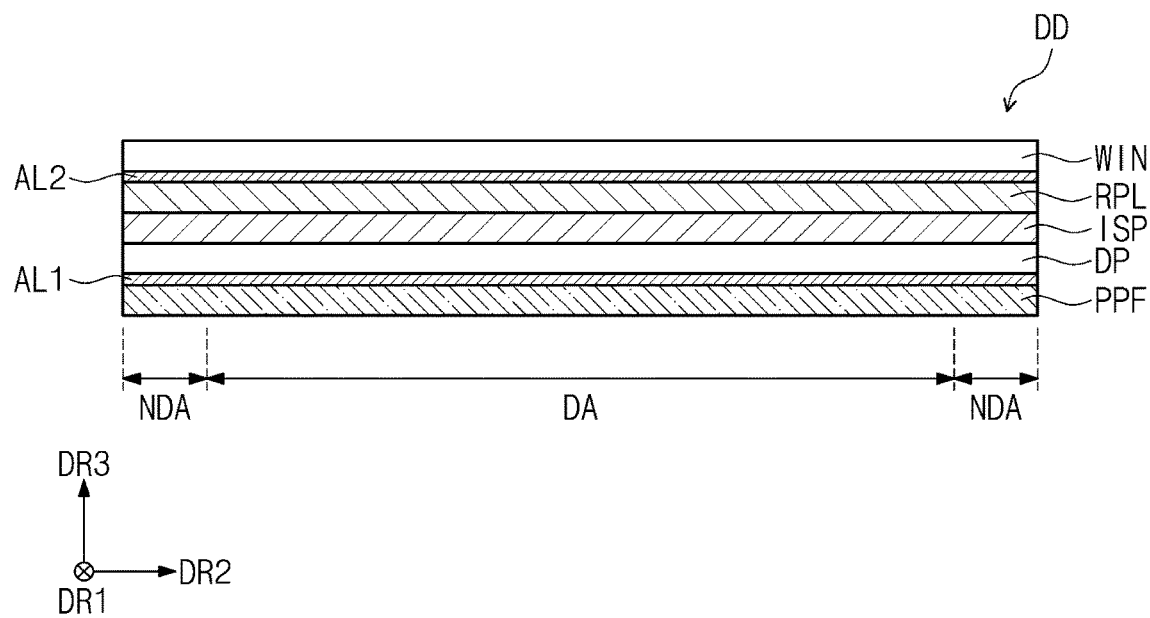
FIG. 2 is a diagram illustrating an example of a cross section of a display device illustrated in FIG. 1.

FIG. 2 is a diagram illustrating an example of a cross-section of the display device shown in FIG. 1.

FIG. 2 illustrates a cross-section of the display device DD when viewed in the first direction DR1.

Referring to FIG. 2, the display device DD may include a display panel DP, an input sensing part ISP, an anti-reflection layer RPL, a window WIN, a panel protection film PPF, and first and second adhesive layers AL1 and AL2.

The display panel DP may be a flexible display panel. The display panel DP according to an embodiment of the present disclosure may be a light emitting display panel, but is not particularly limited thereto. For example, the display panel DP may be an organic light emitting display panel or an inorganic light emitting display panel. An emission layer of the organic light emitting display panel may include an organic light emitting material. An emission layer of the inorganic light emitting display panel may include a quantum dot, a quantum rod, or the like. Below, the description will be given under the condition that the display panel DP is an organic light emitting display panel.

The input sensing part ISP may be disposed on the display panel DP. The input sensing part ISP may include a plurality of sensors (not illustrated) for sensing an external input in a capacitive scheme. The input sensing part ISP may be directly manufactured on the display panel DP in the process of manufacturing the display device DD. However, the present disclosure is not limited thereto. For example, the input sensing part ISP may be manufactured with a panel independent of the display panel DP and may be bonded to the display panel DP by an adhesive layer.

The anti-reflection layer RPL may be disposed on the input sensing part ISP. The anti-reflection layer RPL may be directly manufactured on the input sensing part ISP in the process of manufacturing the display device DD. However, the present disclosure is not limited thereto. For example, the anti-reflection layer RPL may be manufactured with a separate panel and may be bonded to the input sensing part ISP by an adhesive layer.

The anti-reflection layer RPL may be defined as a film for preventing an external light from being reflected. The anti-reflection layer RPL may reduce the reflectance of the external light incident from above the display device DD toward the display panel DP. With the anti-reflection layer RPL present, the external light may not be visually perceived by the user.

When the external light traveling toward the display panel DP is reflected from the display panel DP and is again provided to an external user, the user may visually perceive the external light, like a mirror. To prevent the issue, the anti-reflection layer RPL may include a plurality of color filters displaying the same colors as pixels of the display panel DP.

The color filters may filter an external light with the same colors as the pixels. In this case, the external light may not be visually perceived by the user. However, the present disclosure is not limited thereto. For example, the anti-reflection layer RPL may include a retarder and/or a polarizer for the purpose of reducing the reflectance of the external light.

The window WIN may be disposed on the anti-reflection layer RPL. The window WIN may protect the display panel DP, the input sensing part ISP, and the anti-reflection layer RPL from scratches and impacts.

The panel protection film PPF may be disposed under the display panel DP. The panel protection film PPF may protect a lower portion (or a lower surface) of the display panel DP. The panel protection film PPF may include a flexible plastic material such as Polyethyleneterephthalate (PET).

The first adhesive layer AL1 may be interposed between the display panel DP and the panel protection film PPF, and the display panel DP and the panel protection film PPF may be bonded to each other by the first adhesive layer AL1. The second adhesive layer AL2 may be interposed between the window WIN and the anti-reflection layer RPL, and the window WIN and the anti-reflection layer RPL may be bonded to each other by the second adhesive layer AL2.

Figure 3:
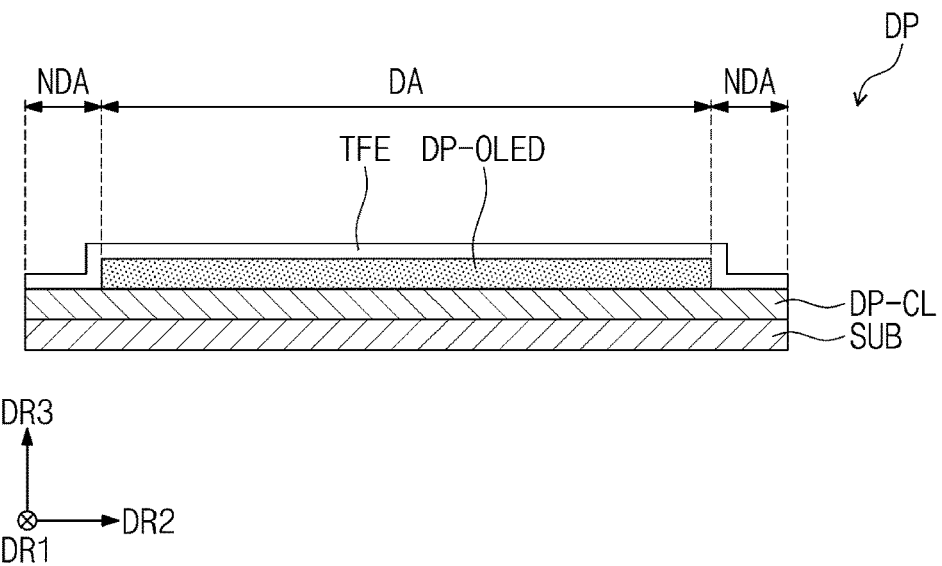
FIG. 3 is a view illustrating an example of a cross section of a display panel illustrated in FIG. 2.

FIG. 3 is a view illustrating an example of a cross section of a display panel illustrated in FIG. 2.

In an embodiment, FIG. 3 shows the cross-section of the display panel DP when viewed in the first direction DR1.

Referring to FIG. 3, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include the display area DA and the non-display area NDA surrounding the display area DA. The substrate SUB may include a glass or a flexible plastic material such as polyimide (PI). The display element layer DP-OLED may be disposed in the display area DA.

A plurality of pixels may be disposed in the circuit element layer DP-CL and the display element layer DP-OLED. Each of the pixels may include a transistor disposed in the circuit element layer DP-CL and a light emitting device disposed in the display element layer DP-OLED and connected with the transistor.

The thin film encapsulation layer TFE may be disposed on the circuit element layer DP-CL so as to cover the display element layer DP-OLED. The thin film encapsulation layer TFE may protect the pixels from moisture, oxygen, and external foreign objects.

Figure 4:
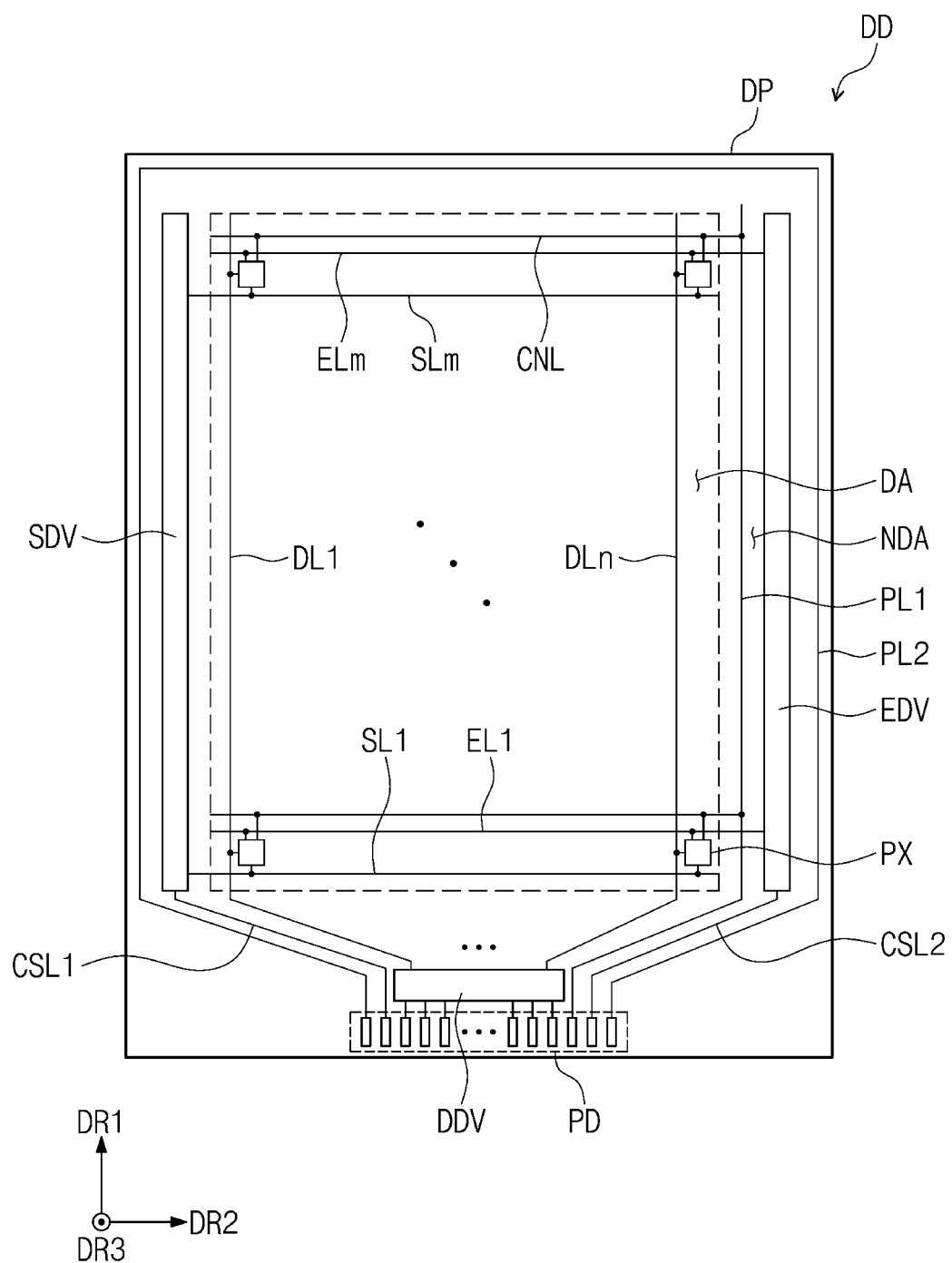
FIG. 4 is a plan view of a display panel illustrated in FIG. 2.

FIG. 4 is a plan view of a display panel illustrated in FIG. 2.

Referring to FIG. 4, the display device DD may include the display panel DP, a scan driver SDV, a data driver DDV, a light emission driver EDV, and a plurality of pads PD.

The display panel DP may be in the shape of a rectangle having long sides extending in the first direction DR1 and short sides extending in the second direction DR2. However, the shape of the display panel DP is not limited thereto. The display panel DP may include the display area DA and the non-display area NDA surrounding the display area DA.

The display panel DP may include a plurality of pixels PX, a plurality of scan lines SL1 to SLm, a plurality of data lines DL1 to DLn, a plurality of light emission lines EL1 to ELm, first and second control lines CSL1 and CSL2, first and second power supply lines PL1 and PL2, and connecting lines CNL. Herein, "m" and "n" are a natural number. Although not illustrated, the display panel DP may include a plurality of fingerprint sensors. Arrangement locations of the fingerprint sensors will be described in detail later.

The pixels PX may be arranged in the display area DA, generally corresponding to the area surrounded by broken lines in FIG. 4. The scan driver SDV and the light emission driver EDV may be disposed in the non-display area NDA so as to be adjacent to the long sides of the display panel DP, respectively. The data driver DDV may be disposed in the non-display area NDA so as to be adjacent to one of the short sides of the display panel DP. In a plan view, the data driver DDV may be adjacent to a lower end of the display panel DP.

The scan lines SL1 to SLm may extend in the second direction DR2 and may be connected with the pixels PX and the scan driver SDV. The data lines DL1 to DLn may extend in the first direction DR1 and may be connected with the pixels PX and the data driver DDV. The light emission lines EL1 to ELm may extend in the second direction DR2 and may be connected with the pixels PX and the light emission driver EDV.

The first power supply line PL1 may extend in the first direction DR1 and may be disposed in the non-display area NDA. The first power supply line PL1 may be interposed between the display area DA and the light emission driver EDV.

The connecting lines CNL may extend in the second direction DR2, may be arranged in the first direction DR1, and may be connected with the first power supply line PL1 and the pixels PX. A first voltage may be applied to the pixels PX through the first power supply line PL1 and the connecting lines CNL that are connected with each other.

The second power supply line PL2 may be disposed in the non-display area NDA and may extend along the long sides of the display panel DP and one short side of the display panel DP at which the data driver DDV is not disposed. The second power supply line PL2 may be disposed between the scan driver SDV and the edge of the display panel DP, and between the light emission driver EDV and the edge of the display panel DP.

Although not illustrated, the second power supply line PL2 may extend toward the display area DA and may be connected with the pixels PX. A second voltage that is lower in level than the first voltage may be applied to the pixels PX through the second power supply line PL2.

The first control line CSL1 may be connected with the scan driver SDV and may extend toward the lower end of the display panel DP. The second control line CSL2 may be connected with the light emission driver EDV and may extend toward the lower end of the display panel DP. The data driver DDV may be interposed between the first control line CSL1 and the second control line CSL2.

The pads PD may be disposed in the non-display area NDA so as to be adjacent to the lower end of the display panel DP and may be closer to the lower end of the display panel DP than the data driver DDV. The data driver DDV, the first and second power supply lines PL1 and PL2, and the first and second control lines CSL1 and CSL2 may be connected with the pads PD. The data lines DL1 to DLn may be connected with the data driver DDV, and the data driver DDV may be connected with the pads PD corresponding to the data lines DL1 to DLn.

Although not illustrated, the display device DD may further include a timing controller for controlling operations of the scan driver SDV, the data driver DDV, and the light emission driver EDV, and a voltage generator for generating the first and second voltages. The timing controller and the voltage generator may be mounted on a printed circuit board and may be connected with the pads PD through the printed circuit board.

The scan driver SDV may generate a plurality of scan signals, and the plurality of scan signals may be applied to the pixels PX through the scan lines SL1 to SLm. The data driver DDV may generate a plurality of data voltages, and the plurality of data voltages may be applied to the pixels PX through the data lines DL1 to DLn. The light emission driver EDV may generate a plurality of light emission signals, and the plurality of light emission signals may be applied to the pixels PX through the light emission lines EL1 to ELm.

The pixels PX may be provided with the data voltages in response to the scan signals. The pixels PX may display an image by emitting a light of luminance corresponding to the data voltages in response to the light emission signals.

Figure 5:
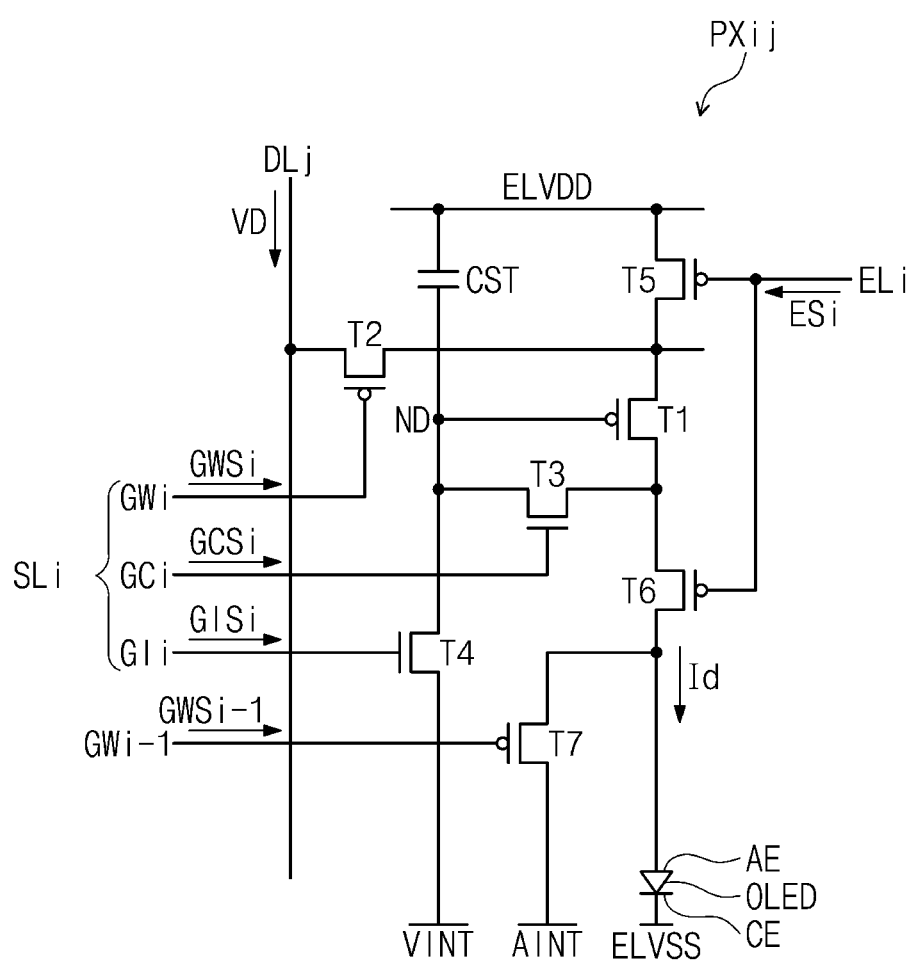
FIG. 5 is a diagram illustrating an equivalent circuit of one pixel illustrated in FIG. 4.

FIG. 5 is a diagram illustrating an equivalent circuit of one pixel illustrated in FIG. 4.

In an embodiment, FIG. 5 shows a pixel PXij connected with an i-th scan line SLi, an i-th light emission line ELi, and a j-th data line DLj. Herein, i is a natural number between 1 and m, inclusive, and j is a natural number between 1 and n, inclusive.

Referring to FIG. 5, the pixel PXij may include a light emitting device OLED, a plurality of transistors T1 to T7, and a capacitor CST. The transistors T1 to T7 and the capacitor CST may control the amount of current flowing to the light emitting device OLED. The light emitting device OLED may generate a light with given luminance depending on the amount of current thus supplied.

The i-th scan line SLi may include an i-th write scan line GWi, an i-th compensation scan line GCi, and an i-th initialization scan line GIi. The i-th write scan line GWi may receive an i-th write scan signal GWSi, the i-th compensation scan line GCi may receive an i-th compensation scan signal GCSi, and the i-th initialization scan line GIi may receive an i-th initialization scan signal GISi.

Each of the transistors T1 to T7 may include a source electrode, a drain electrode, and a gate electrode. Below, for convenience, in FIG. 5, one of the source electrode and the drain electrode is referred to as a "first electrode", and the other thereof is referred to as a "second electrode". Also, the gate electrode is referred to as a "control electrode".

The transistors T1 to T7 may include first to seventh transistors T1 to T7. The first, second, fifth, sixth, and seventh transistors T1, T2, T5, T6, and T7 may include PMOS transistors. The third and fourth transistors T3 and T4 may include NMOS transistors.

The light emitting device OLED may be an organic light emitting device. The light emitting device OLED may include an anode AE and a cathode CE. The anode AE may receive a first voltage ELVDD through the sixth, first, and fifth transistors T6, T1, and T5. The cathode CE may receive a second voltage ELVSS. The first voltage ELVDD may be provided to the pixel PXij through the first power supply line PL1 described above, and the second voltage ELVSS may be provided to the pixel PXij through the second power supply line PL2.

The first transistor T1 may be connected between the fifth transistor T5 and the sixth transistor T6. The first transistor T1 may include a first electrode receiving the first voltage ELVDD through the fifth transistor T5, a second electrode connected with the anode AE through the sixth transistor T6, and a control electrode connected with a node ND.

The first electrode of the first transistor T1 may be connected with the fifth transistor T5, and the second electrode of the first transistor T1 may be connected with the sixth transistor T6. The first transistor T1 may control the amount of current flowing to the light emitting device OLED depending on a voltage of the node ND that is applied to the control electrode of the first transistor T1.

The second transistor T2 may be connected between the data line DLj and the first electrode of the first transistor T1. The second transistor T2 may include a first electrode connected with the data line DLj, a second electrode connected with the first electrode of the first transistor T1, and a control electrode connected with the i-th write scan line GWi.

The second transistor T2 may be turned on by the i-th write scan signal GWSi transferred through the i-th write scan line GWi and may electrically connect the data line DLj and the first electrode of the first transistor T1. The second transistor T2 may perform a switching operation such that a data voltage VD transferred through the data line DLj is provided to the first electrode of the first transistor T1.

The third transistor T3 may be connected between the second electrode of the first transistor T1 and the node ND. The third transistor T3 may include a first electrode connected with the second electrode of the first transistor T1, a second electrode connected with the node ND, and a control electrode connected with the i-th compensation scan line GCi.

The third transistor T3 may be turned on by the i-th compensation scan signal GCSi received through the i-th compensation scan line GCi, and may electrically connect the second electrode of the first transistor T1 and the control electrode of the first transistor T1. When the third transistor T3 is turned on, the first transistor T1 may be connected to the OLED.

The fourth transistor T4 may be connected with the node ND. The fourth transistor T4 may include a first electrode connected with the node ND, a second electrode receiving a first initialization voltage VINT, and a control electrode connected with the i-th initialization scan line GIi. The fourth transistor T4 may be turned on by the i-th initialization scan signal GISi transferred through the i-th initialization scan line GIi and may provide the first initialization voltage VINT to the node ND.

The fifth transistor T5 may include a first electrode receiving the first voltage ELVDD, a second electrode connected with the first electrode of the first transistor T1, and a control electrode connected with the i-th light emission line ELi.

The sixth transistor T6 may include a first electrode connected with the second electrode of the first transistor T1, a second electrode connected with the anode AE, and a control electrode connected with the i-th light emission line ELi.

The fifth transistor T5 and the sixth transistor T6 may be turned on by an i-th light emission signal ESi transmitted through the i-th light emission line ELi. As the first voltage ELVDD is supplied to the light emitting device OLED through the fifth and sixth transistors T5 and T6 thus turned on, a driving current may flow to the light emitting device OLED. Accordingly, the light emitting device OLED may emit light.

The seventh transistor T7 may include a first electrode connected with the anode AE, a second electrode receiving a second initialization voltage AINT, and a control electrode connected with a (i–1)-th write scan line GWi–1. The (i–1)-th write scan line GWi–1 may be defined as a previous write scan line of the i-th write scan line GWi. The seventh transistor T7 may be turned on by a (i–1)-th write scan signal GWSi–1 transferred through the (i–1)-th write scan line GWi–1 and may provide the second initialization voltage AINT to the anode AE.

According to an embodiment of the present disclosure, the seventh transistor T7 may be omitted. According to an embodiment of the present disclosure, the second initialization voltage AINT may be different in level from the first initialization voltage VINT, but the present disclosure is not limited thereto. For example, the second initialization voltage AINT may have the same level as the first initialization voltage VINT.

The capacitor CST may include a first electrode receiving the first voltage ELVDD and a second electrode connected with the node ND. When the fifth transistor T5 and the sixth transistor T6 are turned on, the amount of current flowing through the first transistor T1 may depend on a voltage stored in the capacitor CST.

Figure 6:
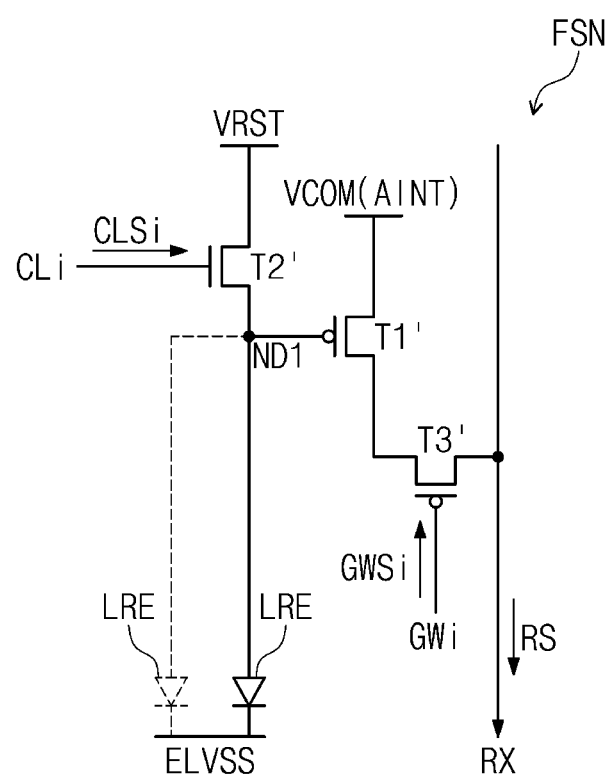
FIG. 6 is an equivalent circuit diagram of a fingerprint sensor embedded in a display panel illustrated in FIG. 4.

FIG. 6 is an equivalent circuit diagram of a fingerprint sensor embedded in a display panel illustrated in FIG. 4.

Referring to FIG. 6, the display panel DP may include a fingerprint sensor FSN in addition to the pixels PX. The fingerprint sensor FSN illustrated in FIG. 6 may be provided in the display panel DP in plurality.

The fingerprint sensor FSN may include a first transistor T1', a second transistor T2', a third transistor T3', and a light receiving element LRE. The first and third transistors T1' and T3' may include PMOS transistors, and the second transistor T2' may include an NMOS transistor.

Below, in each of the first, second, and third transistors T1', T2', and T3' of FIG. 6, one of a source electrode and a drain electrode may be referred to as a "first electrode", and the other thereof may be referred to as a "second electrode". Also, in each of the first, second, and third transistors T1', T2', and T3', a gate electrode may be referred to as a "control electrode".

The first transistor T1' may include a first electrode receiving a voltage VCOM having a given voltage level, a control electrode connected with a node ND1, and a second electrode connected with the third transistor T3'. In an embodiment, the voltage VCOM may be set to the second initialization voltage AINT, but the present disclosure is not limited thereto. For example, the voltage VCOM may be set to any other voltage level.

The second transistor T2' may include a first electrode connected with the node ND1, a control electrode connected with an i-th control line CLi, and a second electrode receiving a reset voltage VRST. The second transistor T2' may be turned on by an i-th control signal CLSi transferred through the i-th control line CLi.

The third transistor T3' may include a first electrode connected with the second electrode of the first transistor T1', a control electrode connected with the i-th write scan line GWi, and a second electrode connected with a receive line RX. The third transistor T3' may be turned on by the i-th write scan signal GWSi transferred through the i-th write scan line GWi.

The light receiving element LRE may be a photo diode. An anode of the light receiving element LRE may be connected with the node ND1, and a cathode of the light receiving element LRE may receive the second voltage ELVSS. The light receiving element LRE may convert light energy incident from the outside into electrical energy.

The fingerprint sensor FSN may include at least one light receiving element LRE. For example, a light receiving element LRE illustrated by a dotted line of FIG. 6 may be further connected with the node ND1. That is, in FIG. 6, the fingerprint sensor FSN may include two light receiving elements LRE, but the number of light receiving elements LRE included in the fingerprint sensor FSN is not limited thereto.

The second transistor T2' may be turned on when the i-th control signal CLSi is applied to the control electrode of the second transistor T2'. The second transistor T2' thus turned on may transfer the reset voltage VRST to the node ND1. The node ND1 may be reset by the reset voltage VRST.

The third transistor T3' may be turned on when the i-th write scan signal GWSi is applied to the control electrode of the third transistor T3'. The first transistor T1' may be connected with the receive line RX by the third transistor T3' thus turned on.

The light receiving element LRE may convert an incident light into an electrical signal; in this case, a voltage of the node ND1 may change. When the first transistor T1' is turned on, the voltage VCOM provided to the first transistor T1' may be controlled depending on a change in the voltage of the node ND1 and may be provided to the receive line RX through the third transistor T3'. Accordingly, a sensing result of the light receiving element LRE may be output through the receive line RX as a sensing signal RS.

Figure 7:
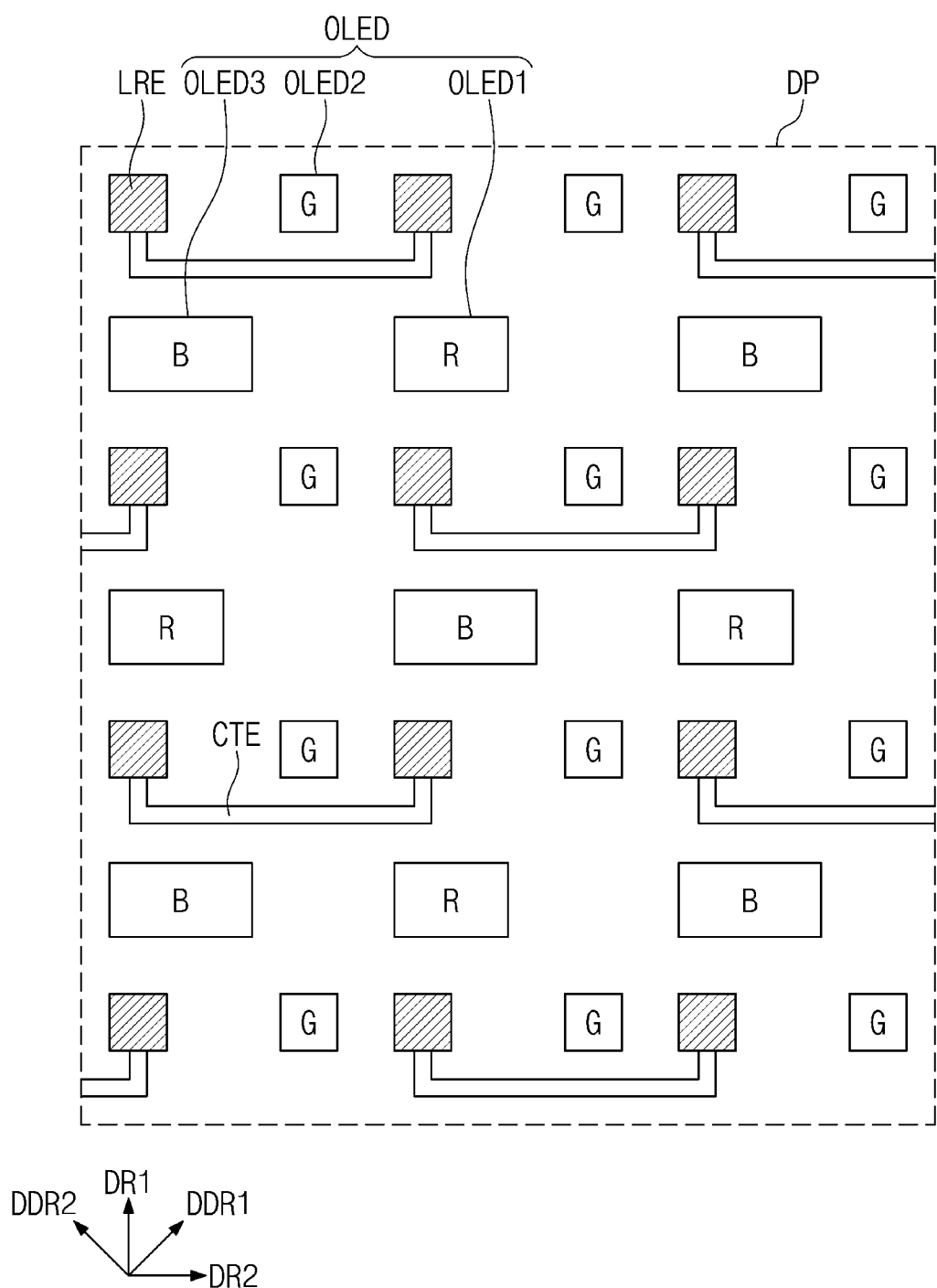
FIG. 7 is an enlarged view of a portion of a display panel illustrated in FIG. 4.

FIG. 7 is an enlarged view of a portion of a display panel illustrated in FIG. 4.

Referring to FIG. 7, the display panel DP may include a plurality of light emitting devices OLED, a plurality of light receiving elements LRE, and a plurality of connecting electrodes CTE. Each of the light emitting devices OLED may correspond to the light emitting device OLED illustrated in FIG. 5. Each of the light receiving elements LRE may correspond to the light receiving element LRE illustrated in FIG. 6.

The light emitting devices OLED may include a plurality of first light emitting devices OLED1, a plurality of second light emitting devices OLED2, and a plurality of third light emitting devices OLED3. In an embodiment, the first light emitting devices OLED1 may display a red color "R", the second light emitting devices OLED2 may display a green color "G", and the third light emitting devices OLED3 may display a blue color "B".

Below, in the specification, a first diagonal direction DDR1 may be defined as a direction intersecting the first and second directions DR1 and DR2 on a plane defined by the first and second directions DR1 and DR2. A second diagonal direction DDR2 may be defined as a direction intersecting the first diagonal direction DDR1 on the plane defined by the first and second directions DR1 and DR2.

The first, second, and third light emitting devices OLED1, OLED2, and OLED3 may be arranged in the first diagonal direction DDR1 and the second diagonal direction DDR2. The first and third light emitting devices OLED1 and OLED3 may be disposed alternately in the first direction DR1 and may be disposed alternately in the second direction DR2. The second light emitting devices OLED2 may be disposed between the first light emitting devices OLED1 arranged in the first diagonal direction DDR1 (or the first and second diagonal directions DDR1 and DDR2) and between the third light emitting devices OLED3 arranged in the first diagonal direction DDR1 (or the first and second diagonal directions DDR1 and DDR2).

Each of the light receiving elements LRE may be interposed between the second light emitting devices OLED2 adjacent to each other in the second direction DR2. Also, each of the light receiving elements LRE may be interposed between the first and third light emitting devices OLED1 and OLED3 adjacent to each other in the first direction DR1. Two light receiving elements LRE adjacent to each other in the second direction DR2 may be connected with each other. The light receiving elements LRE may be connected by the connecting electrodes CTE so as to constitute a plurality of light receiving element (LRE) pairs. The light receiving element (LRE) pairs may be arranged alternately in the first direction DR1.

Figure 8:
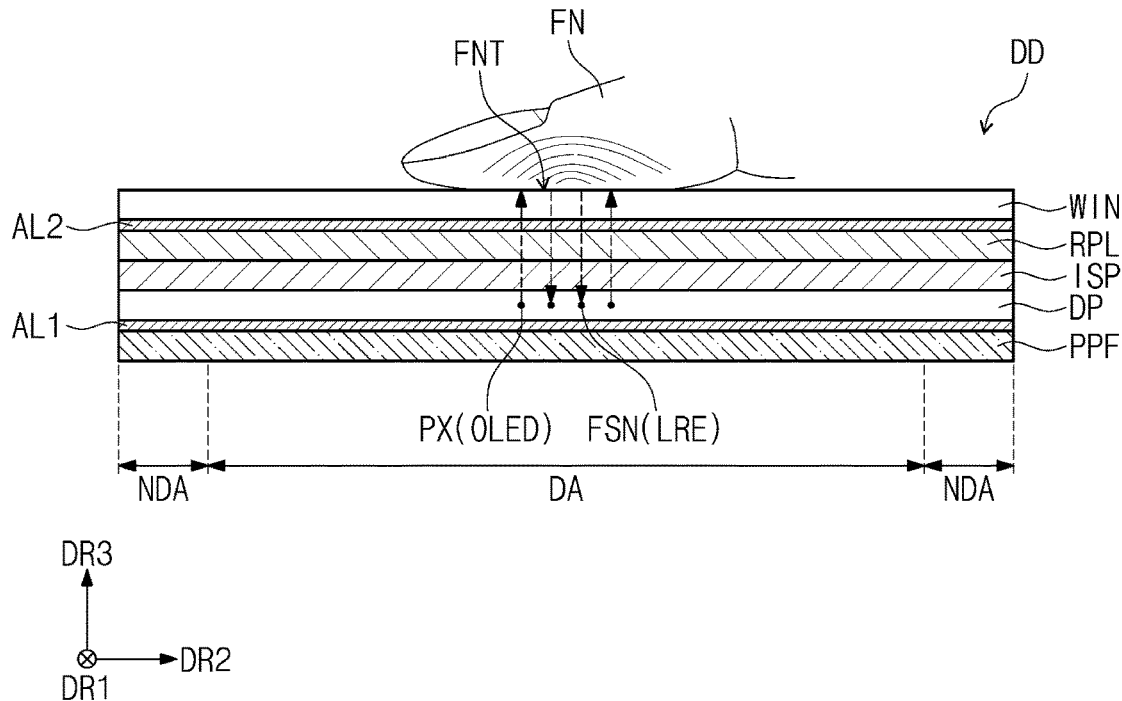
FIG. 8 is a diagram illustrating how a fingerprint is sensed by fingerprint sensors illustrated in FIG. 7.

FIG. 8 is a diagram illustrating how a fingerprint is sensed by fingerprint sensors illustrated in FIG. 7.

Referring to FIG. 8, the fingerprint sensors FSN may sense a fingerprint FNT of a finger FN on the display panel DP. A light generated from the light emitting devices OLED of the pixels PX disposed in the display area DA may be provided to the fingerprint FNT and may be reflected from the fingerprint FNT.

The light reflected from the fingerprint FNT may be provided to the light receiving elements LRE of the fingerprint sensors FSN so as to be sensed. The fingerprint sensor FSN may sense the fingerprint FNT through the light reflected from the fingerprint FNT. A control module (not illustrated) of the display device DD may receive information of the fingerprint FNT sensed by the fingerprint sensor FSN and may perform a user authentication mode by using the received fingerprint information.

Figure 9:
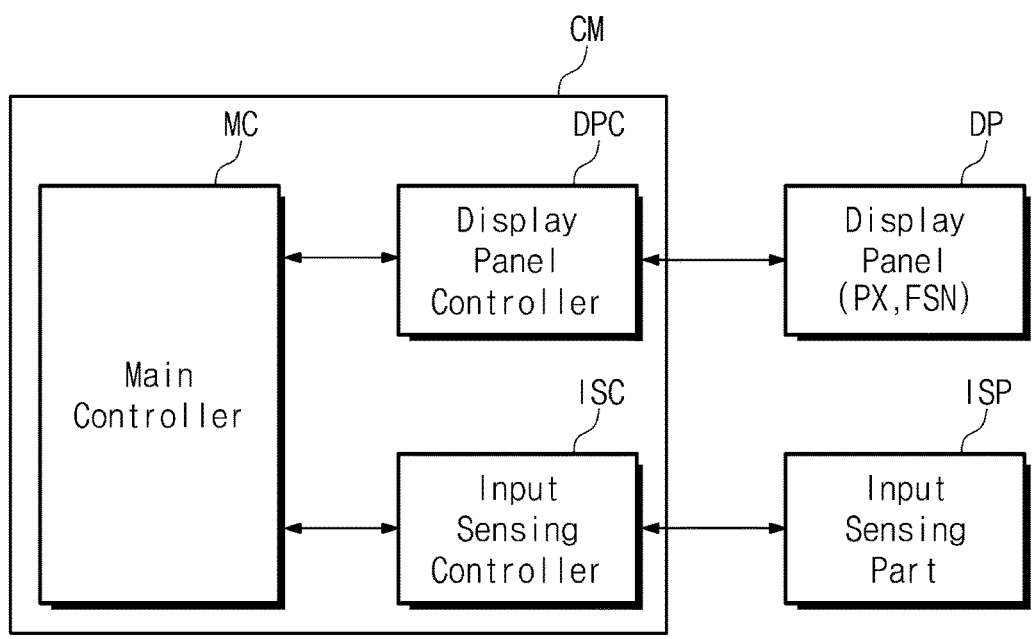
FIG. 9 is a block diagram illustrating an example of a control module for controlling a display panel illustrated in FIG. 4.

FIG. 9 is a block diagram illustrating an example of a control module for controlling a display panel illustrated in FIG. 4.

Referring to FIG. 9, a control module CM may include a main controller MC, a display panel controller DPC controlling an operation of the display panel DP, and an input sensing controller ISC controlling an operation of the input sensing part ISP. The display panel controller DPC may include the timing controller described above.

In an operation of the display device DD, the main controller MC may control the operations of the display panel controller DPC and the input sensing controller ISC. The display panel controller DPC may control the operation of the display panel DP under control of the main controller MC.

The pixels PX and the fingerprint sensors FSN may be driven by the display panel controller DPC. The display panel controller DPC may provide the pixels PX and the fingerprint sensors FSN with driving signals for driving the pixels PX and the fingerprint sensors FSN. The pixels PX may be driven to display an image, and the fingerprint sensors FSN may be driven to sense the fingerprint FNT. The display panel controller DPC may provide information about the fingerprint FNT sensed by the fingerprint sensors FSN to the main controller MC.

Information about the user's fingerprint may be stored in the main controller MC. The main controller MC may compare the sensed fingerprint FNT with the user's fingerprint. This operation may be defined as the user authentication mode. When the sensed fingerprint FNT and the user's fingerprint coincide with each other, the display panel controller DPC may drive the display panel DP in a main mode under control of the main controller MC. When the display panel DP is driven in the main mode, the user may use the display panel DP normally.

A frequency for driving the display panel DP may vary. For example, a frequency that is used to drive the display panel DP when a fingerprint is not sensed may be different from a frequency that is used to drive the display panel DP when a fingerprint is sensed. This operation will be described in detail later.

The input sensing controller ISC may drive the input sensing part ISP under control of the main controller MC. The input sensing controller ISC may convert a signal sensed by the input sensing part ISP into an input signal and may provide the input signal to the main controller MC. The input signal may include location information about a touch of the user when the user touches the input sensing part ISP. The touch location information may be defined as touch coordinates.

Figure 10:
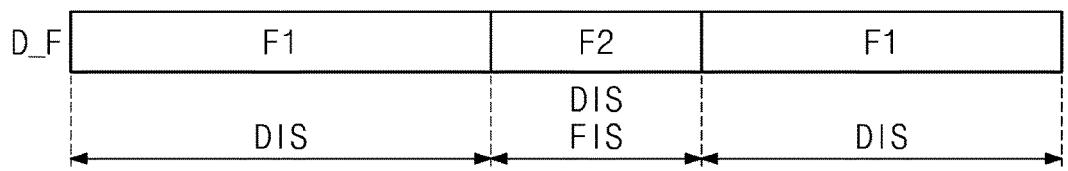
FIG. 10 is a diagram illustrating a timing of a driving frequency for driving a display panel illustrated in FIG. 4.

FIG. 10 is a diagram illustrating a timing of a driving frequency for driving a display panel illustrated in FIG. 4.

Referring to FIG. 10, the display panel DP (refer to FIG. 4) may be driven in a display mode DIS and a fingerprint sensing mode FIS. In the display mode DIS, a given image may be displayed by the pixels PX. In the fingerprint sensing mode FIS, the user's fingerprint may be sensed by the fingerprint sensors FSN.

A driving frequency D_F of the display panel DP may vary. The driving frequency D_F may include a first frequency F1 and a second frequency F2. The second frequency F2 may be lower than the first frequency F1. When the display panel DP is driven in the display mode DIS, not the fingerprint sensing mode FIS, the display panel DP may be driven at the first frequency F1.

When an operation for sensing the user's fingerprint is required, the display panel DP may be driven in the display mode DIS and the fingerprint sensing mode FIS. When the display panel DP is driven in the display mode DIS and the fingerprint sensing mode FIS, the display panel DP may be driven at the second frequency F2. The second frequency F2 may be variable. The above operations will be described in detail later. When a fingerprint sensing operation ends, the display panel DP may again be driven at the first frequency F1.

Figure 11:
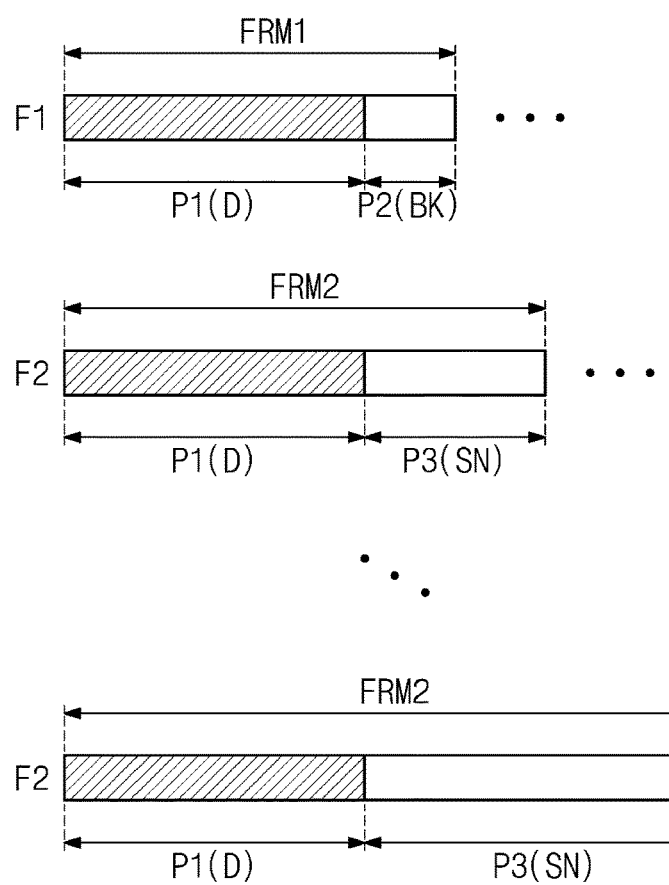
FIG. 11 is a diagram illustrating an example of a timing of one frame associated with each of first and second frequencies illustrated in FIG. 10.

FIG. 11 is a diagram illustrating an example of a timing of one frame associated with each of first and second frequencies illustrated in FIG. 10.

Referring to FIG. 11, the display panel DP may be driven by using a plurality of frames FRM1 and FRM2. The first and second frequencies F1 and F2 may be defined by the frames FRM1 and FRM2. Below, any one frame FRM1 associated with the first frequency F1 and any one frame FRM2 associated with the second frequency F2 will be described.

The frame FRM of the first frequency F1 may be set to be smaller in time than the frame FRM of the second frequency F2. Accordingly, the first frequency F1 may be set to be higher than the second frequency F2.

With regard to the first frequency F1, the frame FRM1 may include a first period P1 and a second period P2 following the first period P1. The second period P2 may be smaller in time than the first period P1. The first period P1 may be defined as a display period "D", and an image may be displayed in the first period P1. The second period P2 may be defined as a blank period BK.

With regard to the second frequency F2, the frame FRM2 may include the first period P1 and a third period P3 following the first period P1. The first period P1 of the frame FRM2 may be the same as the first period P1 of the frame FRM1.

The third period P3 may be a blank period corresponding to the second period P2; however, unlike the second period P2, a fingerprint sensing operation may be performed in the third period P3. For example, the third period P3 may be defined as a fingerprint sensing period SN in which the fingerprint sensing operation is performed by the fingerprint sensors FSN.

The third period P3 may be set to be different from the second period P2. For example, the third period P3 may be set to be longer in time than the second period P2. That is, with regard to the second frequency F2, a blank period may be expanded, and the expanded blank period may be set to the third period P3.

When the fingerprint sensing operation is performed, the display panel DP may be driven at the second frequency F2 lower than the first frequency F1. With regard to the second frequency F2 lower than the first frequency F1, the third period P3 may be expanded by lengthening the blank period as shown in FIG. 11, and the fingerprint sensing operation may be performed in the third period P3 thus expanded. Accordingly, driving time for the fingerprint sensors FSN may be secured more easily.

The second frequency F2 may change. For example, as the third period P3 changes, the second frequency F2 may change. As illustrated in FIG. 11, the third period P3 may increase at a predefined rate. Although not illustrated, the third period P3 may increase at a predetermined manner and may then decrease in a predetermined manner.

Figure 12:
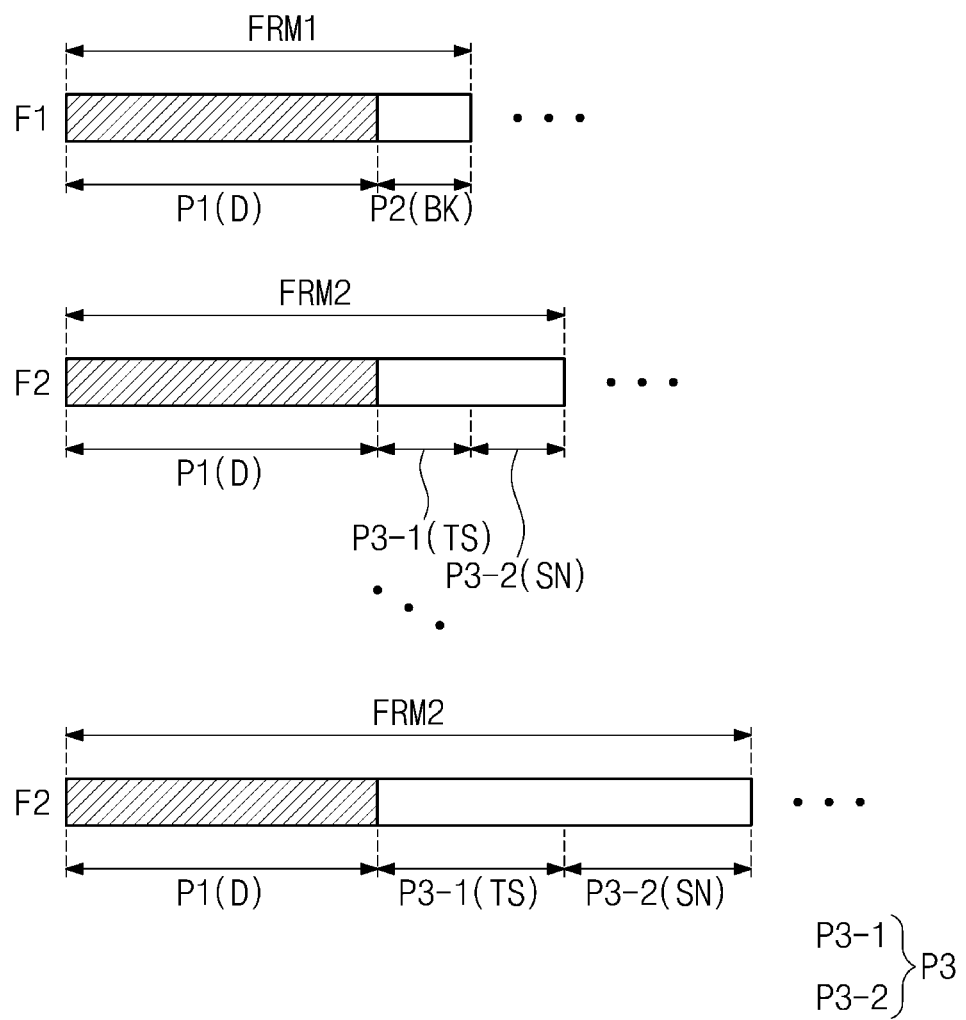
FIG. 12 is a diagram illustrating an example of a timing of one frame associated with each of first and second frequencies, according to another embodiment of the present disclosure.

FIG. 12 is a diagram illustrating an example of a timing of one frame associated with each of first and second frequencies, according to another embodiment of the present disclosure.

The timing of FIG. 12 may be substantially the same as the timing of FIG. 11 except that a touch sensing period TS is added. Accordingly, the description below will focus on a difference between the timing of FIG. 11 and the timing of FIG. 12.

Referring to FIG. 12, the third period P3 may include a (3-1)-th period P3-1 and a (3-2)-th period P3-2 following the (3-1)-th period P3-1. The (3-1)-th period P3-1 may be defined as the touch sensing period TS for sensing a touch on the input sensing part ISP described above. The (3-2)-th period P3-2 may be defined as a fingerprint sensing period SN in which the fingerprint sensing/reading operation is performed.

Although not illustrated, in addition to the first, second, and third periods P1, P2, and P3, a period for sensing a touch on the input sensing part ISP may be present in the frames FRM1 and FRM2. In an embodiment of the present disclosure, as the touch sensing period TS is further set to the third period P3, a touch sensing operation may be further performed.

Figure 13:
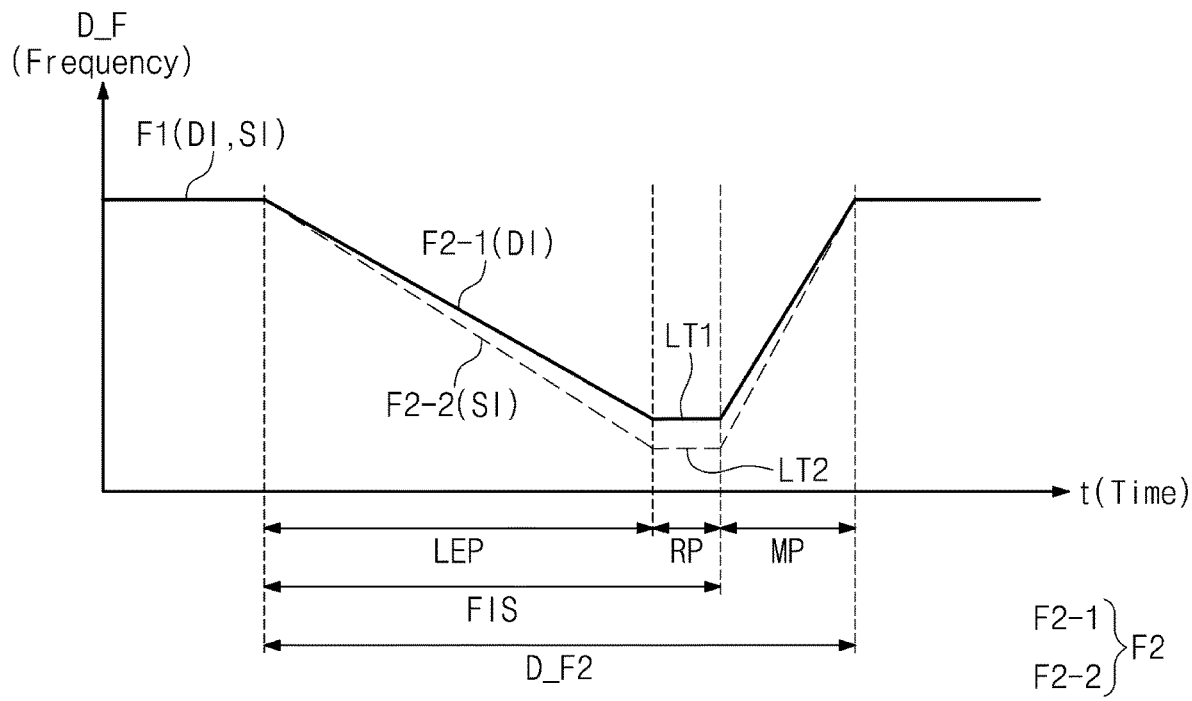
FIG. 13 is a diagram illustrating an example of a variable state of first and second frequencies illustrated in FIG. 10.
Figure 14:
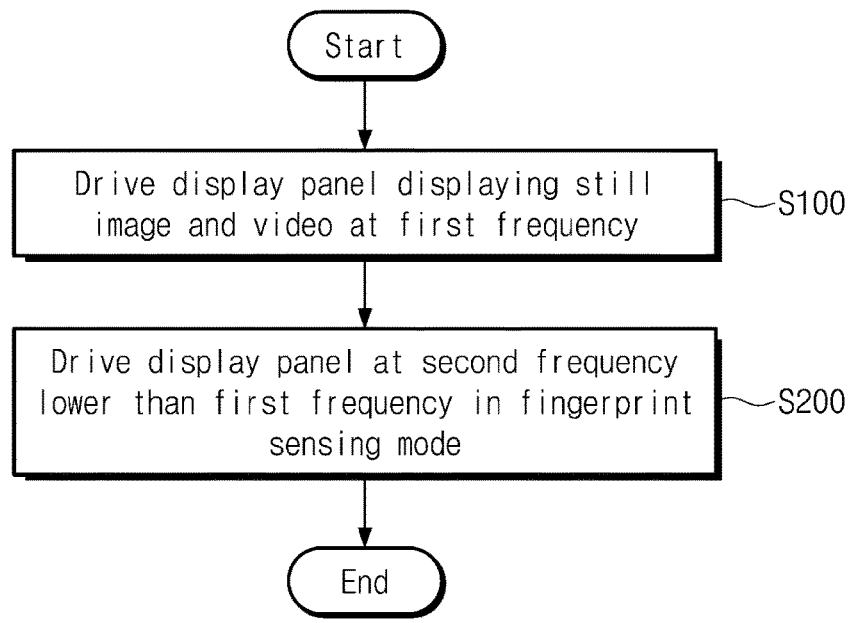
FIGS. 14, 15, and 16 are flowcharts for describing a driving method of a display device according to an embodiment of the present disclosure.
Figure 15:
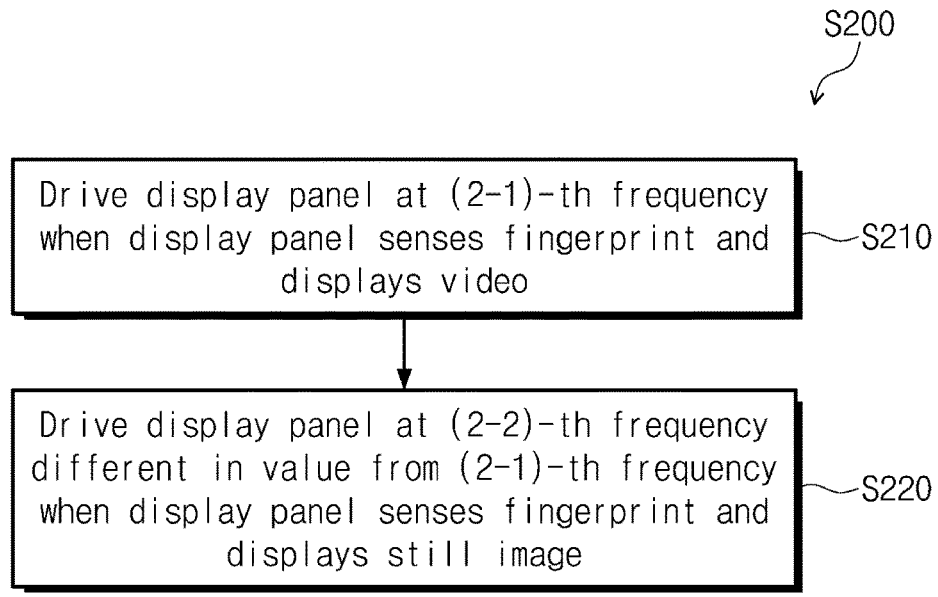
Figure 16:
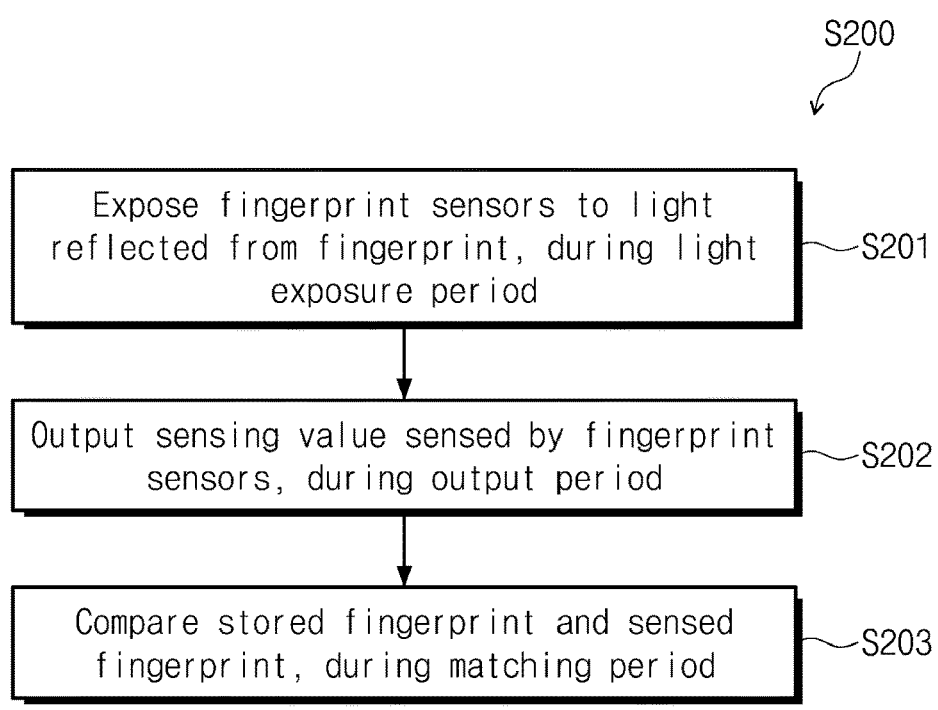

FIG. 13 is a diagram illustrating an example of a variable state of first and second frequencies illustrated in FIG. 10. FIGS. 14, 15, and 16 are flowcharts for describing a driving method of a display device according to an embodiment of the present disclosure.

Referring to FIG. 13, the display panel DP (refer to FIG. 4) may display a dynamic Image DI and a static image SI. The display panel DP may be driven at the first frequency F1 and may then be driven at the second frequency F2 for the purpose of sensing the fingerprint FNT.

A period D_F2 in which the display panel DP is driven at the second frequency F2 may include the fingerprint sensing mode FIS and a matching period MP. The fingerprint sensing mode FIS may include a light exposure period LEP and an output period RP following the light exposure period LEP. The light exposure period LEP may be set to be longer than the output period RP. The matching period MP may follow the output period RP. The light exposure period LEP and the output period RP may be included in the third period P3 (refer to FIG. 11) of each frame FRM (refer to FIG. 11) described above.

In the light exposure period LEP, the light reflected from the finger FN (refer to FIG. 8) may be incident on the light receiving elements LRE. In the output period RP, a sensing result of each light receiving element LRE may be output through the receive line RX (refer to FIG. 6) as the sensing signal RS (refer to FIG. 6). In the matching period MP, a user authentication operation may be performed based on a result of comparing a sensed fingerprint and a stored fingerprint. After the period D_F2, the driving frequency D_F of the display panel DP may again be set to the first frequency F1.

In the period D_F2, when the display panel DP displays the dynamic Image DI, the display panel DP may be driven at a (2-1)-th frequency F2-1. In the period D_F2, when the display panel DP displays the static image SI, the display panel DP may be driven at a (2-2)-th frequency F2-2. In an embodiment, a solid line indicates a frequency graph associated with the dynamic Image DI, and a broken line indicates a frequency graph associated with the static image SI.

Fingerprint sensing/reading sometime happens while an image is being displayed. Referring to FIGS. 13 and 14, in operation S100, the display panel DP that displays the static image SI and the dynamic Image DI without fingerprint sensing may be driven at the first frequency F1. In operation S200, the display panel DP that enters the fingerprint sensing mode FIS may be driven at the second frequency F2 lower than the first frequency F1.

Referring to FIGS. 13 and 15, operation S200 in which the display panel DP is driven at the second frequency F2 may include operation S210 in which the display panel DP is driven at the (2-1)-th frequency F2-1 and operation S220 in which the display panel DP is driven at the (2-2)-th frequency F2-2. The (2-2)-th frequency F2-2 may be different from the (2-1)-th frequency F2-1. For example, the (2-2)-th frequency F2-2 may be lower than the (2-1)-th frequency F2-1. For example, although the rate of change of the (2-1)-th frequency F2-1 and the rate of change the (2-2)-th frequency F2-2 are linearly illustrated in FIG. 13, embodiments of the present disclosure are not limited thereto, the rate of change of the (2-1)-th frequency F2-1 and the rate of change the (2-2)-th frequency F2-2 may not be linear.

The second frequency F2 may be adjusted according to whether the image being displayed is dynamic or still. In operation S210, when the display panel DP senses the fingerprint FNT and displays the dynamic image DI, the display panel DP may be driven at the (2-1)-th frequency F2-1. In operation S220, when the display panel DP senses the fingerprint FNT and displays the static image SI, the display panel DP may be driven at the (2-2)-th frequency F2-2. A frequency of the static image SI in which the same image is maintained may be set to be lower than a frequency of the dynamic image DI in which an image is newly updated (or changed).

The (2-1)-th frequency F2-1 and the (2-2)-th frequency F2-2 may change. Below, a slope associated with a graph indicating how the (2-1)-th frequency F2-1 changes is expressed by a slope of the (2-1)-th frequency F2-1, and a slope associated with a graph indicating how the (2-2)-th frequency F2-2 changes is expressed by a slope of the (2-2)-th frequency F2-2. Although FIG. 13 depicts a linear change in the second frequency F2-1, F2-2, this is not a limitation of the disclosure.

In a period where the (2-1)-th frequency F2-1 and the (2-2)-th frequency F2-2 change, the slope of the (2-1)-th frequency F2-1 may be smaller than the slope of the (2-2)-th frequency F2-2. That is, the (2-2)-th frequency F2-2 may change more sharply than the (2-1)-th frequency F2-1. The (2-1)-th frequency F2-1 may change more gradually than the (2-2)-th frequency F2-2.

Referring to FIGS. 13 and 16, operation S200 in which the display panel DP is driven at the second frequency F2 may further include operation S201, operation S202, and operation S203. Operation S201, operation S202, and operation S203 may be performed at the (2-1)-th frequency F2-1 and the (2-2)-th frequency F2-2.

In operation S201, the fingerprint sensors FSN may be exposed to the light reflected from the fingerprint FNT during the light exposure period LEP. In operation S202, a sensing result of the fingerprint sensors FSN may be output during the output period RP. In operation S203, the user authentication mode may be performed. That is, during the matching period MP, the stored fingerprint and the sensing result, (the sensed fingerprint) may be compared.

In the light exposure period LEP, the (2-1)-th frequency F2-1 and the (2-2)-th frequency F2-2 may change. In the light exposure period LEP, the (2-1)-th frequency F2-1 and the (2-2)-th frequency F2-2 may gradually decrease. In the light exposure period LEP, the slope of the (2-1)-th frequency F2-1 may be smaller than the slope of the (2-2)-th frequency F2-2. Although FIG. 13 depicts the frequency F2-1 and the frequency F2-2 changing at a steady rate, this is not a limitation of the disclosure.

The (2-1)-th frequency F2-1 may decrease to a first minimum value LT1. The (2-2)-th frequency F2-2 may decrease to a second minimum value LT2. The second minimum value LT2 may be smaller than the first minimum value LT1. The first minimum value LT1 may be defined as a minimum value of values of the (2-1)-th frequency F2-1, and the second minimum value LT2 may be defined as a minimum value of values of the (2-2)-th frequency F2-2.

In the output period RP, the (2-1)-th frequency F2-1 and the (2-2)-th frequency F2-2 may not be varied, that is, may be uniformly maintained. In the output period RP, the (2-1)-th frequency F2-1 may have the first minimum value LT1, and the (2-2)-th frequency F2-2 may have the second minimum value LT2. During the output period RP, the (2-1)-th frequency F2-1 may maintain the first minimum value LT1, and the (2-2)-th frequency F2-2 may maintain the second minimum value LT2.

Because the (2-1)-th frequency F2-1 and the (2-2)-th frequency F2-2 have the first minimum value LT1 and the second minimum value LT2 in the output period RP, respectively, the third period P3 described above may be set to be the longest. Accordingly, of the duration for outputting a sensing value may be sufficiently secured. Also, because the light exposure period LEP is set to be long, the period during which the fingerprint sensors FSN are exposed to light may be sufficiently secured. Accordingly, the time for sensing the fingerprint FNT may be sufficiently secured.

In the matching period MP, the (2-1)-th frequency F2-1 and the (2-2)-th frequency F2-2 may increase, for example at a steady rate. After the matching period MP, the driving frequency D_F for driving the display panel DP may again be at the first frequency F1.

As a result, the driving method of the display device DD according to an embodiment of the present disclosure may sufficiently secure a fingerprint sensing time.

Figure 17:
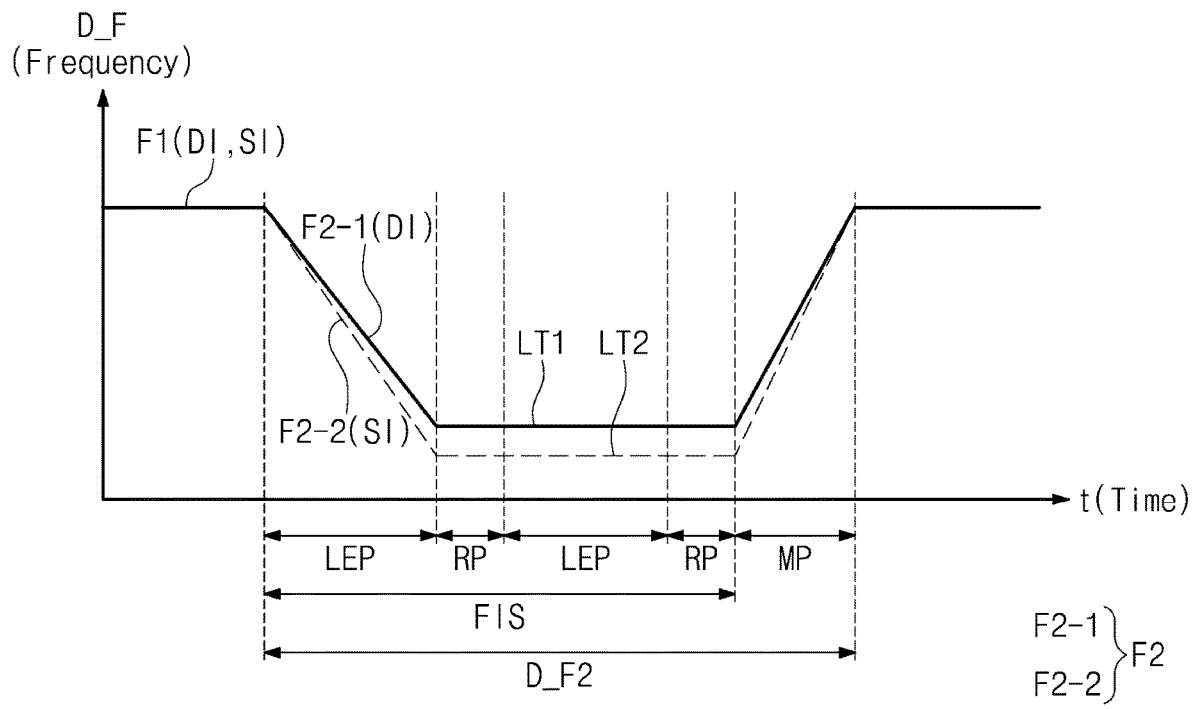
FIG. 17 is a diagram illustrating an example of a variable state of first and second frequencies according to another embodiment of the present disclosure.

FIG. 17 is a diagram illustrating an example of a variable state of first and second frequencies according to another embodiment of the present disclosure.

The description below will focus on a difference between the first and second frequencies F1 and F2 of FIG. 13 and the first and second frequencies F1 and F2 of FIG. 17.

Referring to FIG. 17, each of the light exposure period LEP and the output period RP may be provided in plurality. Two light exposure periods LEP and two output periods RP are illustrated as an example, but the number of light exposure periods LEP and the number of output periods RP are not limited thereto. Each of the output periods RP may be disposed next to each of the light exposure periods LEP. The matching period MP may be disposed next to the last output period RP.

In the first light exposure period LEP of the light exposure periods LEP, the (2-1)-th frequency F2-1 may be varied to gradually decrease to the first minimum value LT1. In the first light exposure period LEP, the (2-2)-th frequency F2-2 may be varied to gradually decrease to the second minimum value LT2. In the first light exposure period LEP, the slope of the (2-1)-th frequency F2-1 may be smaller than the slope of the (2-2)-th frequency F2-2.

In the first output period RP of the output periods RP, the (2-1)-th frequency F2-1 may have the first minimum value LT1, and the (2-2)-th frequency F2-2 may have the second minimum value LT2. From the first output period RP to the last output period RP, the (2-1)-th frequency F2-1 may maintain the first minimum value LT1, and the (2-2)-th frequency F2-2 may maintain the second minimum value LT2. During the matching period MP following the last output period RP, the (2-1)-th frequency F2-1 and the (2-2)-th frequency F2-2 may increase.

Figure 18:
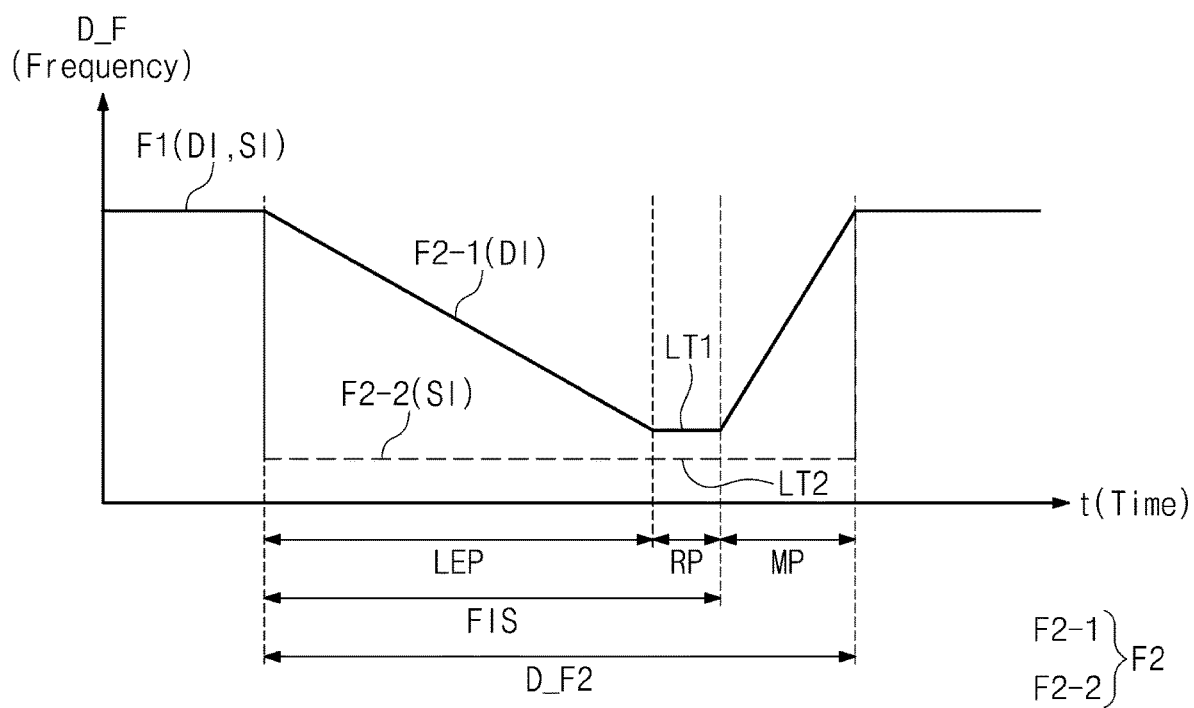
FIG. 18 is a diagram illustrating an example of a variable state of first and second frequencies according to another embodiment of the present disclosure.

FIG. 18 is a diagram illustrating an example of a variable state of first and second frequencies according to another embodiment of the present disclosure.

The description below will focus on a difference between the first and second frequencies F1 and F2 of FIG. 13 and the first and second frequencies F1 and F2 of FIG. 18.

Referring to FIG. 18, when the display panel DP is driven at the second frequency F2, the (2-1)-th frequency F2-1 may be varied to gradually decrease to the first minimum value LT1 in the light exposure period LEP and may be varied to gradually increase in the matching period MP. When the display panel DP is driven at the second frequency F2, the (2-2)-th frequency F2-2 may be set to the second minimum value LT2 immediately at a start point of the light exposure period LEP. The (2-2)-th frequency F2-2 may be set to a value of the first frequency F1 immediately at an end point of the matching period MP.

Figure 19:
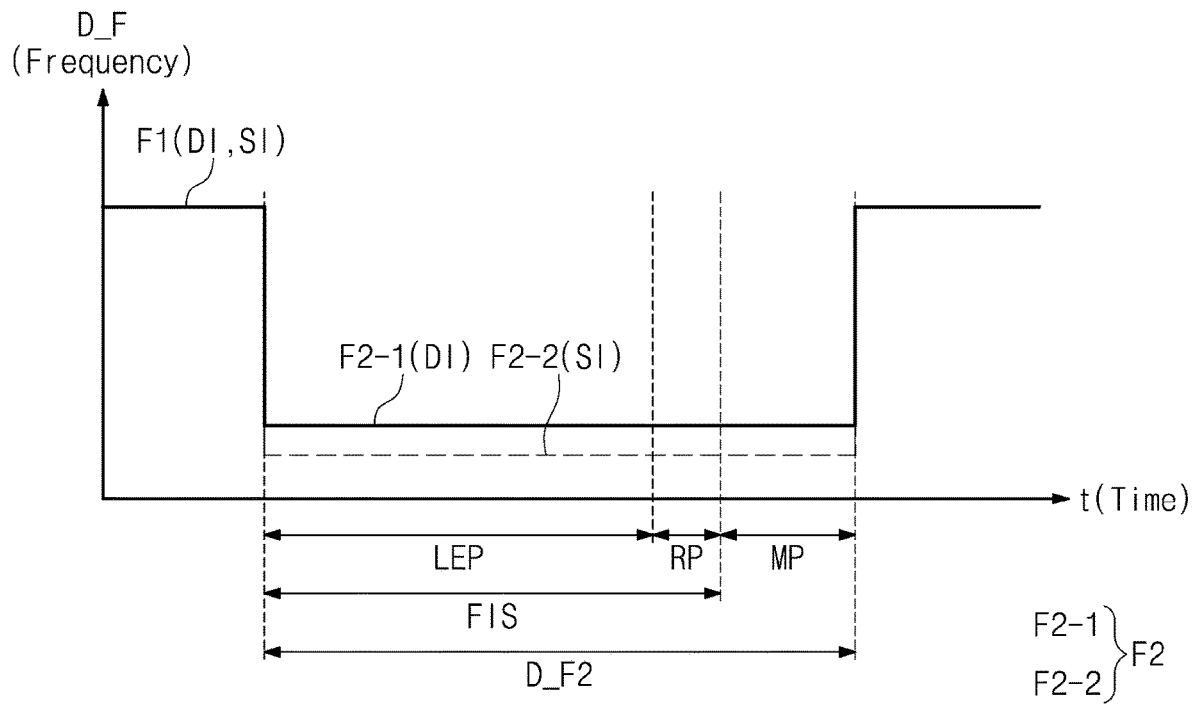
FIG. 19 is a diagram illustrating an example of a variable state of first and second frequencies according to another embodiment of the present disclosure.

FIG. 19 is a diagram illustrating an example of a variable state of first and second frequencies according to another embodiment of the present disclosure.

The description below will focus on a difference between the first and second frequencies F1 and F2 of FIG. 13 and the first and second frequencies F1 and F2 of FIG. 19.

Referring to FIG. 19, when the display panel DP is driven at the second frequency F2, the (2-1)-th frequency F2-1 may be set to the first minimum value LT1 at a start point of the light exposure period LEP. When the display panel DP is driven at the second frequency F2, the (2-2)-th frequency F2-2 may be set to the second minimum value LT2 at a start point of the light exposure period LEP. The (2-1)-th frequency F2-1 and the (2-2)-th frequency F2-2 may be set to a value of the first frequency F1 at an end point of the matching period MP. The responsive frequency may be set immediately or in real time upon detecting the frequency that triggers the response.

Figure 20:
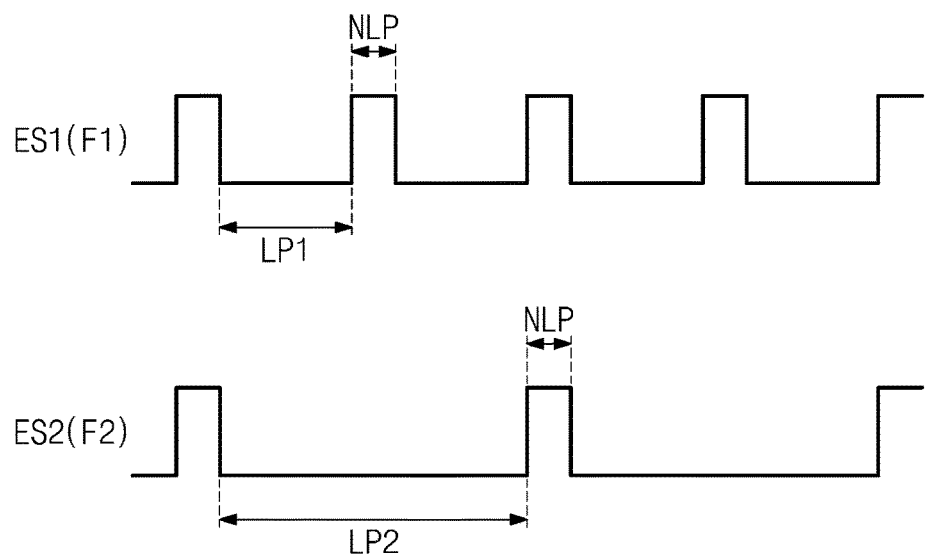
FIG. 20 is a diagram illustrating a timing of light emission signals provided to pixels illustrated in FIG. 4.

FIG. 20 is a diagram illustrating a timing of light emission signals provided to pixels illustrated in FIG. 4.

Referring to FIG. 20, when the display panel DP (refer to FIG. 4) is driven at the first frequency F1, a first light emission signal ES1 may be applied to the pixels PX (refer to FIG. 4). When the display panel DP is driven at the second frequency F2, a second light emission signal ES2 may be applied to the pixels PX. The pixels PX may emit light when the first and second light emission signals ES1 and ES2 are at a low level. A low level period of the first light emission signal ES1 may be defined as a first light emission period LP1. A low level period of the second light emission signal ES2 may be defined as a second light emission period LP2.

A high level period of each of the first and second light emission signals ES1 and ES2 may be defined as a non-light emission period NLP. The non-light emission period NLP of the first light emission signal ES1 may be the same as the non-light emission period NLP of the second light emission signal ES2.

When the display panel DP is driven at the first frequency F1, the pixels PX may emit light during the first light emission period LP1. When the display panel DP is driven at the second frequency F2, the pixels PX may emit a light during the second light emission period LP2. The second light emission period LP2 may be set to be longer than the first light emission period LP1.

In FIG. 11, the third period P3 of the second frequency F2 may be longer than the blank period BK of the first frequency F1 as a blank period. In the case where the blank period is long, the luminance of the pixels PX may decrease. In an embodiment of the present disclosure, because the pixels PX emit light during the second light emission period LP2 that is set to be longer than the first light emission period LP1 at the second frequency F2 where the blank period increases, the decrease in luminance of the pixels PX may be prevented.

According to an embodiment of the present disclosure, a display panel including pixels and fingerprint sensors may be driven at a first frequency when a fingerprint sensing operation is not performed and may be driven at a second frequency lower than the first frequency when the fingerprint sensing operation is performed. At the second frequency, a blank period may be expanded, and the fingerprint sensing operation may be performed during the blank period thus expanded. Accordingly, a driving time of a fingerprint sensor may be secured more easily.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A driving method of a display device, the method comprising:
   driving a display panel, which includes a pixel and a fingerprint sensor and displays a static image and a dynamic image, at a first frequency; and
   driving the display panel at a second frequency lower than the first frequency for a purpose of sensing a finger and reading a fingerprint of the finger through the fingerprint sensor,
   wherein the driving of the display panel at the second frequency includes:
   driving the display panel at a (2-1)-th frequency when the display panel senses the fingerprint and displays the dynamic image; and
   driving the display panel at a (2-2)-th frequency different in value from the (2-1)-th frequency when the display panel senses the fingerprint and displays the static image.

2. The method of claim 1, wherein the (2-2)-th frequency is lower than the (2-1)-th frequency.

3. The method of claim 1, wherein the (2-1)-th frequency and the (2-2)-th frequency change with time.

4. The method of claim 3, wherein, during a period where the (2-1)-th frequency and the (2-2)-th frequency are changing, the (2-2)-th frequency changes at a faster rate than the (2-1)-th frequency.

5. The method of claim 3, wherein the driving of the display panel at the second frequency further includes:
   exposing the fingerprint sensor to light that is reflected of the finger during a light exposure period; and
   outputting a sensing value sensed by the fingerprint sensor during an output period following the light exposure period.

6. The method of claim 5, wherein the (2-1)-th frequency and the (2-2)-th frequency decrease during the light exposure period.

7. The method of claim 5, wherein, in the output period, the (2-1)-th frequency has a first minimum value, and the (2-2)-th frequency has a second minimum value smaller than the first minimum value.

8. The method of claim 5, wherein the driving of the display panel at the second frequency further includes:
   comparing a stored fingerprint and a sensed fingerprint during a matching period following the output period,
   wherein, during the matching period, the (2-1)-th frequency and the (2-2)-th frequency increase.

9. The method of claim 5, wherein the light exposure period includes a plurality of light exposure periods,
   wherein the output period includes a plurality of output periods,
   wherein each of the plurality of output periods is disposed next to each of the plurality of light exposure periods, and
   wherein, during a first light exposure period of the plurality of light exposure periods, the (2-1)-th frequency and the (2-2)-th frequency decrease.

10. The method of claim 9, wherein, in a first output period of the plurality of output periods, the (2-1)-th frequency has a first minimum value, and the (2-2)-th frequency has a second minimum value smaller than the first minimum value.

11. The method of claim 10, wherein, from the first output period to a last output period, the (2-1)-th frequency maintains the first minimum value, and the (2-2)-th frequency maintains the second minimum value.

12. The method of claim 9, wherein the driving of the display panel at the second frequency further includes:
   comparing a stored fingerprint and a sensed fingerprint during a matching period following a last output period of the plurality of output periods, and
   wherein, during the matching period, the (2-1)-th frequency and the (2-2)-th frequency increase.

13. The method of claim 1, wherein, in the driving of the display panel at the second frequency, the (2-1)-th frequency decreases to a first minimum value at a slower rate than the (2-2)-th frequency is changed to a second minimum value smaller than the first minimum value.

14. The method of claim 1, wherein, in the driving of the display panel at the second frequency, the (2-1)-th frequency is changed to a first minimum value, and the (2-2)-th frequency is changed to a second minimum value smaller than the first minimum value.

15. The method of claim 1, wherein the display panel is driven by using a plurality of frames,
   wherein, at the first frequency, each of the frames include:
   a first period displaying an image; and
   a second period defined as a blank period following the first period,
   wherein, at the second frequency, each of the frames include:
   the first period; and
   a third period during which a fingerprint sensing operation is performed by the fingerprint sensor, the third period following the first period, and
   wherein the third period is different from the second period.

16. The method of claim 15, wherein the third period is longer than the second period.

17. The method of claim 15, wherein a length of the third period is adjustable.

18. The method of claim 15, wherein the third period includes:
   a (3-1)-th period for sensing a touch on an input sensing part disposed on the display panel; and
   a (3-2)-th period in which the fingerprint sensing operation is performed.

19. The method of claim 1, wherein, when the display panel is driven at the first frequency, the pixel emits a light during a first light emission period, and
   wherein, when the display panel is driven at the second frequency, the pixel emits light during a second light emission period longer than the first light emission period.

20. A driving method of a display device, the method comprising:
   driving a display panel, which includes a pixel and a fingerprint sensor and displays a static image and a dynamic image at a first frequency; and
   driving the display panel at a second frequency lower than the first frequency for a purpose of sensing a fingerprint through the fingerprint sensor,
   wherein the driving of the display panel at the second frequency includes:
   driving the display panel at a (2-1)-th frequency when the display panel senses the fingerprint and displays the dynamic image; and
   driving the display panel at a (2-2)-th frequency when the display panel senses the fingerprint and displays the static image,
   wherein the (2-1)-th frequency and the (2-2)-th frequency are varied to gradually decrease, and
   wherein a slope associated with a variable state of the (2-1)-th frequency is smaller than a slope associated with a variable state of the (2-2)-th frequency.

* * * * *